United States Patent
McAuliffe et al.

(10) Patent No.: US 9,732,789 B2
(45) Date of Patent: Aug. 15, 2017

(54) JOURNAL AIR BEARING WITH AIR-FILM-SUPPLY VENT

(71) Applicant: HAMILTON SUNDSTRAND CORPORATION, Windsor Locks, CT (US)

(72) Inventors: Christopher McAuliffe, Windsor, CT (US); Ronald M. Struziak, Longmeadow, MA (US); Darryl A. Colson, West Suffield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 83 days.

(21) Appl. No.: 14/498,283

(22) Filed: Sep. 26, 2014

(65) Prior Publication Data

US 2016/0091015 A1 Mar. 31, 2016

(51) Int. Cl.
F16C 32/06 (2006.01)
F16C 17/02 (2006.01)
F16C 37/00 (2006.01)
F16C 43/02 (2006.01)

(52) U.S. Cl.
CPC .......... *F16C 17/024* (2013.01); *F16C 37/002* (2013.01); *F16C 43/02* (2013.01); *F16C 2326/43* (2013.01)

(58) Field of Classification Search
CPC ...... F16C 17/024; F16C 17/042; F16C 17/10; F16C 33/1005
See application file for complete search history.

(56) References Cited

U.S. PATENT DOCUMENTS

| 4,701,060 | A | 10/1987 | Gu |
| 4,818,123 | A * | 4/1989 | Gu ........................ F16C 17/024 384/103 |
| 5,248,205 | A * | 9/1993 | Gu ........................ F16C 17/042 384/106 |
| 5,902,049 | A * | 5/1999 | Heshmat ............... F16C 17/024 384/106 |
| 5,911,511 | A | 6/1999 | Saville |
| 7,648,279 | B2 | 1/2010 | Struziak et al. |
| 8,419,283 | B2 * | 4/2013 | McAuliffe ............ F16C 17/024 384/103 |

FOREIGN PATENT DOCUMENTS

EP 1980762 A2 10/2008
EP 2412994 A2 2/2012

OTHER PUBLICATIONS

European Search Report for EP Application No. 15186927.8 dated Feb. 15, 2016.

* cited by examiner

*Primary Examiner* — James Pilkington
(74) *Attorney, Agent, or Firm* — Cantor Colburn LLP

(57) ABSTRACT

A journal air bearing is provided. The bearing includes a top foil configured to receive the shaft, an intermediate foil disposed radially outboard the top foil, and a journal sleeve disposed radially outboard the intermediate foil. The intermediate foil defines a plurality of holes configured to act as a vent to communicate fluid to an increased supply area to an air film.

8 Claims, 2 Drawing Sheets

JOURNAL AIR BEARING WITH AIR-FILM-SUPPLY VENT

BACKGROUND OF INVENTION

This invention relates, generally, to a journal air bearing (hydrodynamic fluid film journal bearing or foil bearing) and, more specifically, to such a bearing used in AMS rotating machinery.

As known, a journal air bearing supports a rotatable component, such as a shaft disposed within an air-cycle machine of an aircraft. A typical arrangement of such a bearing includes a top foil, an intermediate foil, and a bump foil. The foils are received within a journal sleeve and wrapped around the component. The top foil is disposed closer to the component than is each of the other foils. The bearing uses a fluid, such as air, to support the component during its rotation. There is little or no contact between the top foil and component when it rotates.

The bearing may include also a formed key that extends radially relative to an axis of rotation of the component. The key is received within a slot or keyway defined in the sleeve and contacts edges defined by the slot to limit rotation of the foils relative to the component. The air communicates through a clearance provided at the key and is pressurized during the rotation. The bearing acts as a pump that draws in ambient air axially along the keyway and then through viscous-shear drives that drive the air circumferentially around the bearing, creating a high-pressure pocket or air film to react to radial loads. The air film defines an entrance or a supply area. The pressure varies depending upon a circumferential location thereof relative to the keyway, such varied pressure being able to destabilize the component. The pressure can typically peak at about 180° from the key.

It is desirable to provide increased capacity to the bearing through an increased supply area to the air film, which results in lower entrance losses and a more efficient pumping action for viscous shear that produces the air film.

BRIEF DESCRIPTION OF INVENTION

According to a non-limiting exemplary embodiment of the invention, a journal air bearing for a rotatable shaft of an air cycle machine is provided. The bearing includes a top foil configured to receive the shaft, an intermediate foil disposed radially outboard the top foil, and a journal sleeve disposed radially outboard the intermediate foil. The intermediate foil defines a row of a plurality of holes configured to act as a vent to communicate fluid to an increased supply area to a fluid film.

The row of holes of the intermediate foil provides a third path for the fluid to enter the fluid film, resulting in an increase in the supply area. The bearing provides increased capacity through the increase in the supply area to the fluid film, which results in lower entrance losses and a more efficient pumping action for viscous shear that produces the fluid film.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION OF INVENTION

Figure 1:
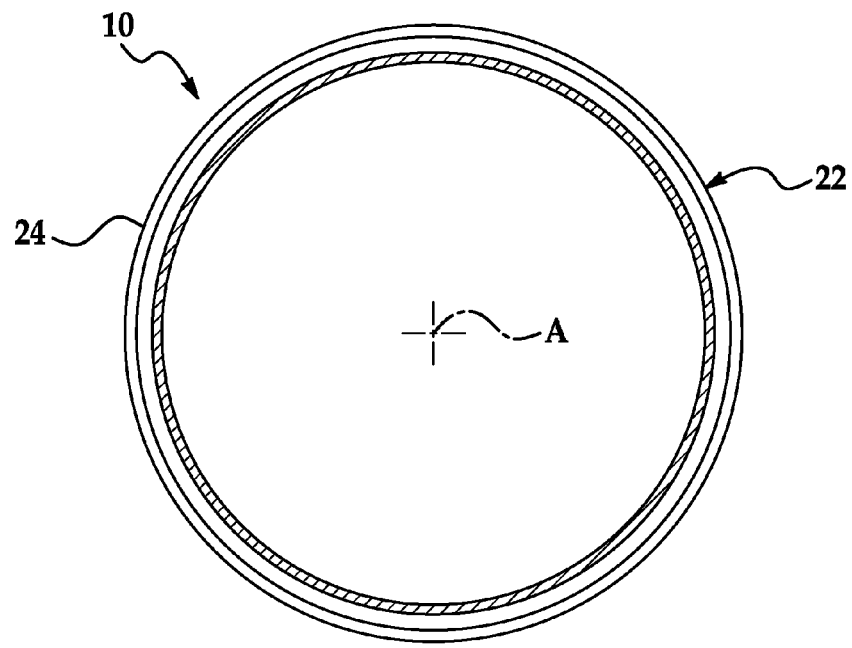
FIG. 1 is an end view of a non-limiting exemplary embodiment of a journal air bearing according to the invention.

Referring now to FIG. 1, a non-limiting exemplary embodiment of a hydrodynamic fluid film journal air bearing is generally indicated at 10. Although the bearing 10 is disclosed herein as being implemented with AMS rotating machinery (more specifically, a rotatable component, such as a shaft, disposed within an air-cycle machine of an aircraft), it should be appreciated that the bearing can be implemented with other aircraft accessories (such as turbo-compressors, cabin air compressors, or ram air fans).

Figure 2:
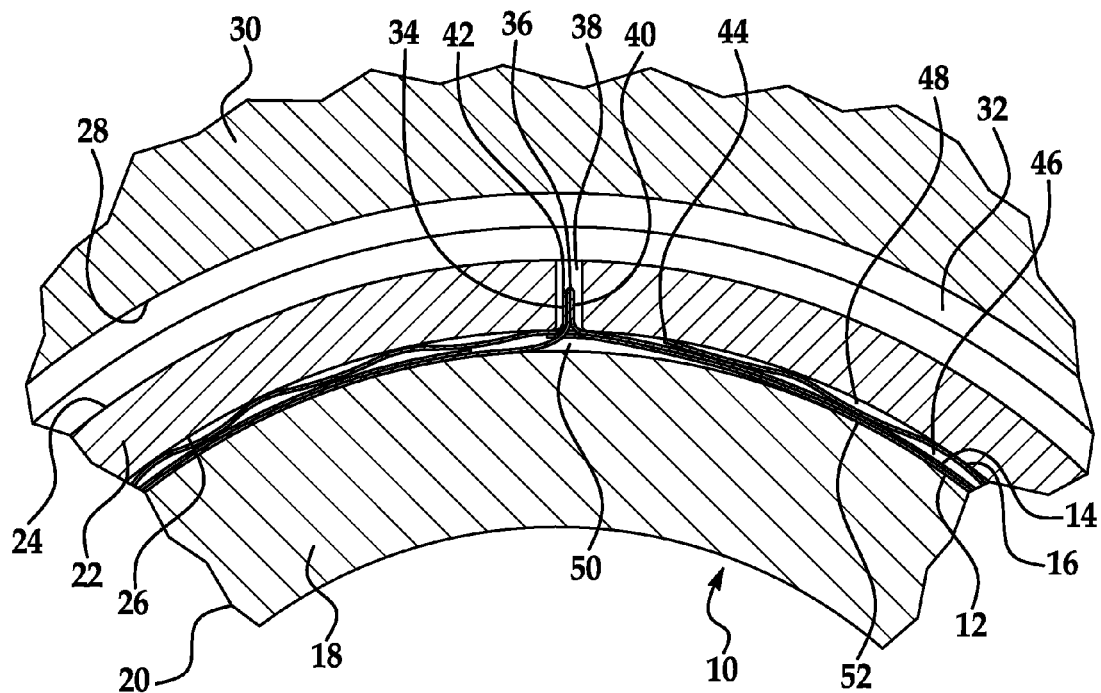
FIG. 2 is a partial environmental view of the embodiment of the journal air bearing illustrated in FIG. 1 supporting a rotatable shaft of an air-cycle machine.

As shown in FIGS. 1 and 2, the bearing 10 includes a top foil 12, an intermediate foil 14, and a bump foil 16 and rotatably supports a rotatable component—namely, a shaft 18—of an air-cycle machine 20. Each of the top, intermediate, and bump foils 12, 14, 16 defines a tab and free end. The shaft 18 is positioned inside the bearing 10 and typically rotates clockwise with respect to the view of the bearing 10 shown in FIG. 2. The bearing 10 and shaft 18 are received within a journal sleeve 22 formed as a unitary body that defines outer and inner diameter surfaces 24, 26 and, in turn, is received within a bore 28 of a housing 30. The sleeve 22 is arranged about a central rotational axis "A," and O-rings 32 are used to retain the sleeve 22 positioned within the bore 28.

It should be noted that the sleeve 22 can be conventionally cylindrical or shaped with any suitable profile, made of a metallic material, and shaped using known techniques—such as milling, turning, and grinding. It should be noted also that the O-rings 32 can be of a conventional type known for use with hydrodynamic fluid film journal bearings.

The foils 12, 14, 16 are arranged inside the sleeve 22. Each of the foils 12, 14, 16 is a thin sheet of material (e.g., nickel-based alloys or steel) wrapped or rolled in a generally cylindrical shape and positioned in a bore of the sleeve 22. The bump foil 16 is corrugated, allowing a working or cooling fluid—such as air—to flow through spaces formed between adjacent corrugations. The bump foil 16 is also positioned adjacent to the inner diameter surface 26 of the sleeve 12 and defines a bent end 34 that can be angled at approximately 90° with respect to an adjacent, generally cylindrical portion of the bump foil 16.

A formed key 36 extends radially relative to the shaft 18 and is received within a key slot (or keyway) 38 defined within the sleeve 22. More specifically, the slot 38 extends entirely through a wall defined between the outer and inner diameter surfaces 24, 26 of the sleeve 22. The slot 38 also is elongated and rectangular and arranged generally parallel to the axis "A." The slot 38 also defines a first end that is spaced from a first end of the sleeve 22 a distance and second end that is spaced from a second end of the sleeve 22 a distance. In a version of the embodiment, one distance is greater than the other such that the slot 38 is axially (or longitudinally) offset with respect to a length of the sleeve 22. The slot 38 can be offset in this manner for fool-proofing purposes during assembly of the bearing 10. In another version, the slot 38 can be axially centered relative to the sleeve 22. The bent end 34 of the bump foil 16 extends radially outward at least partially into the slot 38 to engage the slot 38 and retain the bump foil 16 relative to the sleeve 22. When the shaft 18 rotates, the key 36 contacts edges defined by the slot 38, which prevents the bearing 10 from rotating with the shaft 18.

When installed with respect to the shaft 18 as part of the bearing 10, the top, intermediate, and bump foils 12, 14, 16 are wrapped about or around the shaft 36. More specifically, the top foil 12 is positioned radially outboard the shaft 18 and adjacent to and radially inboard the intermediate foil 14, and the intermediate foil 14 is positioned adjacent to and radially inboard the bump foil 16. The bump foil 16 is disposed radially outboard the top and intermediate foils 12, 14 and biases the intermediate foil 14 toward the top foil 12 to hold respective positions of the top and intermediate foils 12, 14 relative to the shaft 18.

The top and intermediate foils 12, 14 are joined together at a bent region 40 that extends radially outward at least partially into the slot 38 to engage the slot 38 and retain both the top and intermediate foils 12, 14 relative to the sleeve 22. The bent region 40 can be angled at approximately 90° with respect to corresponding adjacent, generally cylindrical portions of the top and intermediate foils 12, 14. In a version of the embodiment, the top and intermediate foils 12, 14 are formed by opposite first and second end portions 42, 44 of a single integral piece or sheet that join at the bent region 40, which is located in a middle portion of the sheet. In another version, the top and intermediate foils 12, 14 are formed from separate sheets connected together at the bent region 40 using welding, brazing, or other suitable attachment means. The key 36 joins the top and intermediate foils 12, 14 with each other.

The air is communicated through channels 46 defined between the intermediate and bump foils 14, 16 and channels 48 defined between the bump foil 16 and sleeve 22. The air removes thermal energy from the bearing 10.

The air is communicated also to an area defined between the top foil 12 and shaft 18 through a gap 50. More specifically, the shaft 18 rotates when the machine 20 operates. Rotation of the shaft 18 causes the air to form a cushion (often referred to as an "air bearing" or "air film") 52 that supports the shaft 18 while rotating at operating speed. In particular, the rotation causes the air to pressurize in areas between the top foil 12 and shaft 18, urging the top foil 12 radially away from the shaft 18. The shaft 18 then rotates as the shaft 18 is supported by the pressurized air. There is little or no contact between the top foil 12 and shaft 18 when the shaft 18 is rotating at an operational speed of the shaft 18. However, contact between the top foil 12 and shaft 18 may still occur at relatively low operational speed, such as during start-up and shutdown phases, and due to incidental contact during regular operation of the machine 20.

In a version of the embodiment, the shaft 18 rotates into a wedge area on a vent side. A form radius of the foil 12, 14, 16 is, for example, about 0.020" on the vent side, which is less than or approximately equal to half of a form radius of the foil 12, 14, 16 on the opposite side, which is about 0.040". Also, the foil 12, 14, 16 on the vent side is lower (near to an edge of the slot 38) than is the foil 12, 14, 16 on the opposite side. In this way, the hydrodynamic air film 52 is generated.

Figure 3:
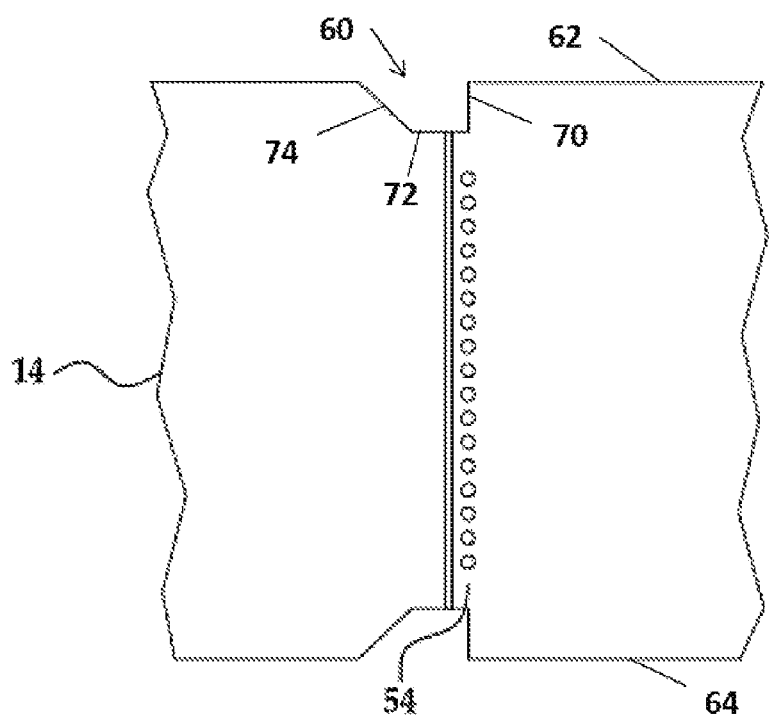
FIG. 3 is an elevated view of an intermediate foil of the embodiment of the journal air bearing illustrated in FIG. 1 in an unwrapped state.
Figure 4:
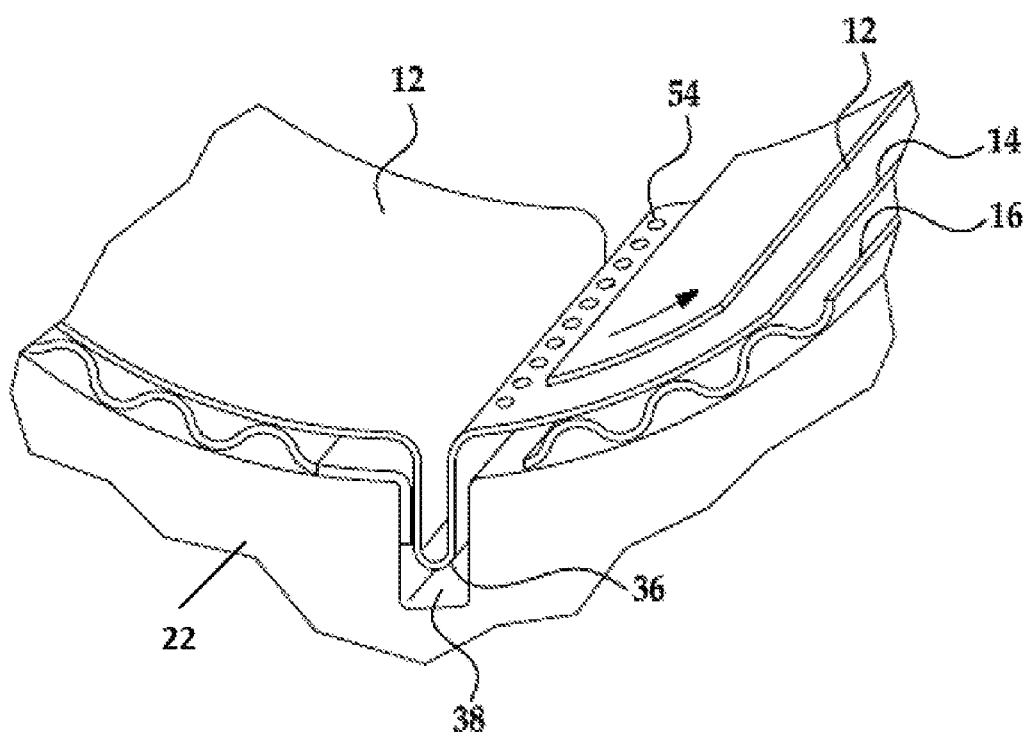
FIG. 4 is a perspective view of the embodiment of the journal air bearing illustrated in FIG. 1 showing the shaft rotating counter-clockwise.

Referring now to FIGS. 3 and 4 with continuing reference to FIGS. 1 and 2, the shaft 18 is shown rotating counter-clockwise. The rotation is into a free end of each of the top and bump foils 12, 16 located on a same side of the key 36 within the sleeve 22. A row of a plurality of holes 54 is defined in the intermediate foil 14 and configured to act as a vent to communicate the air to an increased supply area to the air film 52. The holes 54 are located on the same side of the key 36 as are located the respective free ends of the top and bump foils 12, 16. A notch 60 is defined in the intermediate foil 14 and extends from one edge 62 of the intermediate foil 14 towards another edge 64 of the intermediate foil 14 that is disposed opposite the one edge 62. The notch 60 has a first wall 70, a second wall 72, and a third wall 74. The first wall 70 extends from the one edge 62 of the intermediate foil 14 towards the another edge 64 of the intermediate foil 14. The second wall 72 extends from the first wall 70 and is disposed parallel to the one edge 62 of the intermediate foil 14. The third wall 74 extends from the second wall 72 towards the one edge 62 of the intermediate foil 14. The third wall 74 is disposed in a non-parallel and non-perpendicular relationship with the one edge 62 of the intermediate foil 14.

When the top and intermediate foils 12, 14 are wrapped around the shaft 18, the row of holes 54 is slightly offset with the key 36. In a version or versions of the embodiment, there are no coatings (described in detail below) and/or no indentations defined in the intermediate foil 14 at or near the respective holes 54. In another version, a radially inner surface of the top foil 12 exposed to the shaft 18 is coated with a suitable dry film lubricant. Use of such lubricant can reduce friction caused by the shaft 18 when the shaft 18 is accelerating to operating speed, decelerating from the operating speed, stopped, and/or subject to incidental contact with the top foil 12 during regular operation of the machine 20.

The holes 54 provide a path for communicating the air from between the top and intermediate foils 12, 14 and the intermediate and bump foils 12, 14. Allowing the air to communicate in this manner provides increased capacity to the bearing 10 through an increased supply area to the air film 52, which results in lower entrance losses and a more efficient pumping action for viscous shear that produces the air film 52.

A communication path provided by the holes 54 is slightly offset with the key 36 to facilitate communication of the air to the supply area to the air film 52. In a version of the embodiment, the row of holes 54 extends from one edge of the intermediate foil 14 to the other edge. In another version, the row extends only partially from the one edge to the other edge. In a version of the embodiment, the row of holes 54 is parallel with the axis "A" of the shaft 18, the holes 54 are linearly spaced from each other, and end holes 54 are spaced from the respective edges of the intermediate foil 14. In another version or other versions, the row of holes 54 is not parallel with the axis "A" and/or linear. Other types of aperture 54, such as a slot, may be used to provide the communication path to the supply area to the air film 52.

Each of the holes 54 defines a diameter of the hole 54. In a version of the embodiment, the diameters are equal to each other. In an aspect, the diameter is about 0.05+/−about 0.01 centimeters (0.020+/−about 0.002 inch). In another version, the diameters are different than each other. In yet another version, some of the diameters are equal to each other while others are different than those and equal to each other. In still another version, some of the diameters are equal to each other while others are different than those and each other.

In a version of the embodiment, there are seventeen holes 54. However, it should be appreciated that there can be any suitable number of the holes 54.

In this way, capacity of the bearing 10 at low speed of the shaft 18 is improved. The row of holes 54 of the intermediate foil 14 provides a third path for the air to enter the air film 52, resulting in an increase in the supply area. The bearing 10 provides increased capacity through the increase in the supply area to the air film 52, which results in lower entrance losses and a more efficient pumping action for viscous shear that produces the air film 52.

Another way to improve the capacity of the bearing 10 is to increase stiffness of the top foil 12 such that deformation of the top foil 12 is reduced relative to thickness of the air film 52. Otherwise, the deformation—which can be approximately equal to the thickness of the air film 52—allows peak pressure of the air film 52 to vent down valleys defined between respective adjacent lines of contact of the bump foil 16, which limits capacity of the bearing 10. In a version of the embodiment, thickness of the top foil 12 is about 0.0076 centimeters (0.003") to about 0.0102 centimeters (0.004"), and pitch of the bump foil 16 is about 0.47 centimeters (0.186") to about 0.35 centimeters (0.136"), greatly reducing the deformation.

Another way to improve the capacity of the bearing 10 is to reduce finish for a coating or surface of the top foil 12. At loads approaching capacity, the thickness of the air film 52 is on the order of roughness of the surface. By reducing an allowable maximum of the surface finish, variation of the surface—which can disrupt the air film 52—is reduced and, in turn, the capacity of the bearing 10 is increased. In a version of the embodiment, the allowable maximum of the surface finish of the top foil 12 is about 12 Ra, and the surface finish of the shaft 18 is about 4 Ra.

Another way to improve the capacity of the bearing 10 is to reduce variation in thickness of the intermediate foil 14. Coating of the intermediate foil 14 is eliminated to reduce the thickness variation of the intermediate foil 14 that would otherwise exist due to the coating, which would translate into "load deflection" variation. In a version of the embodiment, the coating of the intermediate foil 14 is eliminated so that the total thickness variation is about (0.00203 centimeters) 0.0008". This has an added benefit of increasing damping of the bearing 10 by increasing a coefficient of friction between the top and intermediate foils 12, 14, leading to more "Coulomb" damping and reduction of ACM sub-synchronous response.

Another way to improve the capacity of the bearing 10 is to reduce pre-load of the bearing 10. Tighter (smaller) load deflections result in reduced capacity of the bearing 10. In a version of the embodiment, for an applied load of about +/−5.44 kilograms (+/−12 lbs.), the allowable deflection is about 0.0076 centimeters (0.003") to about 0.0102 centimeters (0.004").

Another way to improve the capacity of the bearing 10 is to increase a projected area of the bearing 10 to a length-to-diameter ratio of about 2.0. In a version of the embodiment, a width of the top foil 12 is about 4.36 centimeters (1.717").

Also, with respect to the top foil 12, any anti-skewing tabs are flat. In this regard, U.S. Pat. No. 7,648,279 (rights in which are owned by present assignee of record) discusses anti-skewing tabs of a hydrodynamic fluid film journal air bearing (such discussion and corresponding figures of the patent being incorporated herein by reference). This flatness eliminates any potential local hard spots and allows for a more robust design for handling.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A journal air bearing, comprising:
a journal sleeve that receives a rotatable shaft, the journal sleeve being spaced apart from the rotatable shaft;
a top foil disposed between the journal sleeve and the rotatable shaft, the top foil and the rotatable shaft defining a gap there between;
an intermediate foil disposed radially outboard of the top foil, the intermediate foil defines a plurality of holes and a notch having a first wall extending from one edge of the intermediate foil towards another edge of the intermediate foil, a second wall extending from the first wall and disposed parallel to the one edge of the intermediate foil, a third wall extending from the second wall towards the one edge of the intermediate foil and is disposed in a non-parallel and non-perpendicular relationship with the one edge of the intermediate foil; and
a bump foil having a plurality of corrugations, the bump foil disposed between the intermediate foil and the journal sleeve, wherein air flows through spaces formed between adjacent corrugations, wherein rotation of the shaft creates an air film that supports the shaft within the journal sleeve and the plurality of holes communicates the air that flows through the spaces formed between adjacent corrugations to the air film; and
a formed key extending radially relative to the rotatable shaft and the holes of the intermediate foil are disposed immediately adjacent to the formed key and the holes are aligned with the first wall of the notch of the intermediate foil.

2. The air-cycle machine of claim 1, wherein the holes are disposed in a row that extends from the one edge of the intermediate foil to the another edge of the intermediate foil.

3. The air-cycle machine of claim 2, wherein the row of holes is parallel with a rotational axis of the shaft, the holes are linearly spaced from each other, and end ones of the holes are spaced from respective edges of the intermediate foil.

4. The air-cycle machine of claim 1, wherein the top foil is joined to the intermediate foil.

5. The journal air bearing of claim 1, wherein the top foil has a thickness within a range of 0.0076 centimeters (0.003 inches) to 0.0102 centimeters (0.004 inches).

6. The journal air bearing of claim 1, wherein the bump foil has a pitch within a range of 0.47 centimeters (0.186 inches) to 0.35 centimeters (0.136 inches).

7. The journal air bearing of claim 1, wherein the top foil has a width of 4.36 centimeters (1.717 inches).

8. The journal air bearing of claim 1, wherein the intermediate foil has a total thickness variation of 0.00203 centimeters (0.0008 inches).

* * * * *